(12) United States Patent
Lemaitre et al.

(10) Patent No.: US 9,722,220 B2
(45) Date of Patent: Aug. 1, 2017

(54) ELEMENT FOR MOUNTING A BATTERY IN A WINDING TUBE OF A HOME-AUTOMATION SCREEN

(71) Applicant: SOMFY SAS, Cluses (FR)

(72) Inventors: Sébastien Lemaitre, Cluses (FR); Julien Peillex, Cluses (FR)

(73) Assignee: SOMFY SAS, Cluses (FR)

( * ) Notice: Subject to any disclaimer, the term of this patent is extended or adjusted under 35 U.S.C. 154(b) by 0 days.

(21) Appl. No.: 14/408,047

(22) PCT Filed: Jun. 13, 2013

(86) PCT No.: PCT/EP2013/062297
§ 371 (c)(1),
(2) Date: Dec. 15, 2014

(87) PCT Pub. No.: WO2013/186319
PCT Pub. Date: Dec. 19, 2013

(65) Prior Publication Data
US 2015/0179994 A1 Jun. 25, 2015

(30) Foreign Application Priority Data

Jun. 13, 2012 (FR) ...................................... 12 55522

(51) Int. Cl.
E06B 9/68 (2006.01)
H01M 2/10 (2006.01)
E06B 9/72 (2006.01)

(52) U.S. Cl.
CPC ................. *H01M 2/10* (2013.01); *E06B 9/68* (2013.01); *E06B 9/72* (2013.01); *E06B 2009/6809* (2013.01)

(58) Field of Classification Search
CPC ..................................... E06B 9/72; E06B 9/68
(Continued)

(56) References Cited

U.S. PATENT DOCUMENTS 3,998,516 A * 12/1976 Mabuchi ............... H01M 2/105
429/100
4,265,320 A 5/1981 Tanaka et al.
(Continued)

FOREIGN PATENT DOCUMENTS

DE 40 38 419 A1 6/1991
DE 298 18 023 U1 12/1998
(Continued)

OTHER PUBLICATIONS

International Search Report dated Jul. 23, 2013, issued in corresponding application No. PCT/EP2013/062297, and Written Opinion; with English partial translation and partial machine translation (16 pages).

(Continued)

*Primary Examiner* — Katherine Mitchell
*Assistant Examiner* — Johnnie A Shablack
(74) *Attorney, Agent, or Firm* — Westerman, Hattori, Daniels & Adrian, LLP

(57) ABSTRACT

Element (12) for holding a power supply device (5) for supplying power to an actuator (4) for controlling a movable screen (3), the actuator causing a drive shaft to rotate, the holding element comprising a body (120) provided with a hole (125) for receiving at least part of the power supply device and a longitudinal slit (126) on at least part of the body.

27 Claims, 3 Drawing Sheets

(58) Field of Classification Search
USPC .................................................. 160/310, 331
See application file for complete search history.

(56) References Cited

U.S. PATENT DOCUMENTS

| | | | | |
|---|---|---|---|---|
| 4,615,371 | A * | 10/1986 | Clauss | E04F 10/0648 160/22 |
| 4,997,022 | A * | 3/1991 | Klein | 160/265 |
| 5,029,629 | A * | 7/1991 | Cheng-Pei | E06B 9/90 160/300 |
| 5,148,849 | A * | 9/1992 | Faludy | 160/67 |
| 6,060,852 | A * | 5/2000 | Domel et al. | 318/480 |
| 6,158,563 | A * | 12/2000 | Welfonder | E06B 9/90 160/291 |
| 6,189,592 | B1 * | 2/2001 | Domel | 160/85 |
| 6,421,175 | B1 * | 7/2002 | Shopp | 359/461 |
| 6,628,029 | B2 * | 9/2003 | Astegno | 310/105 |
| 6,843,301 | B2 * | 1/2005 | Carrillo et al. | 160/310 |
| 6,979,962 | B2 * | 12/2005 | Cavarec et al. | 318/9 |
| 7,057,360 | B1 * | 6/2006 | Hsu | 318/105 |
| 7,231,953 | B2 * | 6/2007 | Varley et al. | 160/273.1 |
| 7,234,503 | B2 * | 6/2007 | Kwak | E06B 9/42 160/295 |
| 7,237,592 | B2 * | 7/2007 | Arnoux et al. | 160/310 |
| 7,549,458 | B2 * | 6/2009 | Kwak | E06B 9/42 160/319 |
| 7,686,061 | B2 * | 3/2010 | Mullet et al. | 160/191 |
| 7,690,694 | B2 * | 4/2010 | Poder | F16L 37/0985 285/308 |
| 7,723,939 | B2 | 5/2010 | Carmen, Jr. | |
| 7,816,028 | B2 * | 10/2010 | Rivetta | H01M 2/024 220/507 |
| 7,830,600 | B2 * | 11/2010 | Jiang | 359/461 |
| 8,004,224 | B2 * | 8/2011 | Marchetto et al. | 318/466 |
| 8,258,993 | B2 * | 9/2012 | Inoue et al. | 341/176 |
| 8,307,878 | B2 * | 11/2012 | Faller et al. | 160/310 |
| 8,368,328 | B2 * | 2/2013 | Mullet et al. | 318/255 |
| 8,371,358 | B1 * | 2/2013 | Mullet et al. | 160/310 |
| 8,464,776 | B2 * | 6/2013 | Anthoine | 160/310 |
| 8,513,845 | B2 * | 8/2013 | Angelini | 310/83 |
| 8,575,872 | B2 * | 11/2013 | Mullet et al. | 318/255 |
| 8,659,246 | B2 * | 2/2014 | Mullet et al. | 318/255 |
| 8,662,139 | B2 * | 3/2014 | Anthony | E06B 9/88 160/121.1 |
| 8,723,454 | B2 * | 5/2014 | Skinner | E06B 9/322 318/16 |
| 8,739,854 | B2 * | 6/2014 | Mullet et al. | 160/293.1 |
| 8,776,861 | B2 * | 7/2014 | Bohlen et al. | 160/310 |
| 8,800,633 | B2 * | 8/2014 | Mullet et al. | 160/317 |
| 8,807,196 | B2 * | 8/2014 | Mullet et al. | 160/317 |
| 8,919,419 | B2 * | 12/2014 | Mullet et al. | 160/317 |
| 8,944,138 | B2 * | 2/2015 | Feldstein et al. | 160/310 |
| 8,960,260 | B2 * | 2/2015 | Anderson | E06B 9/72 160/310 |
| 9,018,868 | B2 * | 4/2015 | Lucas et al. | 318/255 |
| 9,054,541 | B2 * | 6/2015 | Morita | H02J 7/0044 |
| 9,095,908 | B2 | 8/2015 | Mullet et al. | |
| 9,334,688 | B2 | 5/2016 | Colson et al. | |
| 2003/0015301 | A1 * | 1/2003 | Killo et al. | 160/310 |
| 2004/0129849 | A1 | 7/2004 | Walker et al. | |
| 2005/0072532 | A1 * | 4/2005 | Holden et al. | 160/66 |
| 2005/0087313 | A1 * | 4/2005 | Nichols et al. | 160/310 |
| 2005/0205216 | A1 * | 9/2005 | Vrielink | 160/23.1 |
| 2005/0225269 | A1 | 10/2005 | Barak | |
| 2006/0086874 | A1 * | 4/2006 | Habel et al. | 248/268 |
| 2006/0137837 | A1 * | 6/2006 | Costello et al. | 160/317 |
| 2007/0155236 | A1 | 7/2007 | Shi et al. | |
| 2008/0067278 | A1 * | 3/2008 | Fortunato et al. | 242/407 |
| 2008/0212294 | A1 | 9/2008 | Ares | |
| 2008/0230192 | A1 * | 9/2008 | Kane | 160/311 |
| 2009/0310264 | A1 * | 12/2009 | Cooper et al. | 361/23 |
| 2010/0078137 | A1 * | 4/2010 | Angelini | E06B 9/88 160/311 |
| 2010/0175838 | A1 * | 7/2010 | Faller et al. | 160/310 |
| 2010/0200176 | A1 * | 8/2010 | Magli | E06B 9/72 160/300 |
| 2010/0219306 | A1 * | 9/2010 | Detmer et al. | 248/201 |
| 2010/0269988 | A1 | 10/2010 | Mullet et al. | |
| 2010/0282890 | A1 * | 11/2010 | Ducornetz et al. | 242/404 |
| 2011/0048655 | A1 * | 3/2011 | Andreasen et al. | 160/310 |
| 2011/0203748 | A1 * | 8/2011 | Mullet | E06B 9/42 160/310 |
| 2011/0265958 | A1 * | 11/2011 | Skinner et al. | 160/127 |
| 2012/0024485 | A1 * | 2/2012 | Mullet | E06B 9/60 160/313 |
| 2012/0031571 | A1 * | 2/2012 | Mullet | E06B 9/40 160/310 |
| 2013/0099714 | A1 * | 4/2013 | Mullet | H02P 3/08 318/468 |
| 2013/0105095 | A1 * | 5/2013 | Anderson et al. | 160/310 |
| 2013/0199735 | A1 * | 8/2013 | Colson et al. | 160/2 |
| 2013/0220560 | A1 * | 8/2013 | Mullet et al. | 160/291 |
| 2013/0269885 | A1 * | 10/2013 | Cavarec et al. | 160/311 |
| 2013/0276995 | A1 * | 10/2013 | Mullet et al. | 160/310 |
| 2013/0285580 | A1 | 10/2013 | Mullet et al. | |
| 2013/0312920 | A1 * | 11/2013 | Mullet et al. | 160/310 |
| 2014/0014281 | A1 * | 1/2014 | Mullet et al. | 160/311 |
| 2014/0069595 | A1 * | 3/2014 | Chen | 160/291 |
| 2014/0076508 | A1 * | 3/2014 | Mullet et al. | 160/310 |
| 2014/0130989 | A1 * | 5/2014 | Chan et al. | 160/309 |
| 2014/0133019 | A1 * | 5/2014 | Mullet et al. | 359/461 |
| 2014/0224437 | A1 * | 8/2014 | Colson et al. | 160/291 |
| 2014/0262067 | A1 * | 9/2014 | Higgins et al. | 160/120 |
| 2014/0329034 | A1 * | 11/2014 | Taylor | B29C 67/0014 428/12 |
| 2014/0352893 | A1 * | 12/2014 | Malott | 160/67 |
| 2015/0034258 | A1 * | 2/2015 | Bohlen et al. | 160/310 |
| 2015/0034259 | A1 * | 2/2015 | Bohlen et al. | 160/310 |
| 2015/0034260 | A1 * | 2/2015 | Blair et al. | 160/310 |
| 2015/0075732 | A1 * | 3/2015 | Kirby et al. | 160/310 |
| 2015/0136338 | A1 * | 5/2015 | Lemaitre et al. | 160/310 |
| 2015/0179994 | A1 * | 6/2015 | Lemaitre et al. | 160/310 |
| 2015/0191973 | A1 * | 7/2015 | Bohlen | 160/291 |
| 2015/0209525 | A1 * | 7/2015 | Bicknell | A61M 5/2033 604/110 |
| 2015/0364960 | A1 * | 12/2015 | Arimatsu | H02K 1/278 310/156.28 |

FOREIGN PATENT DOCUMENTS

| | | | |
|---|---|---|---|
| DE | 102004016417 B3 * | 10/2005 | ............ F16C 11/02 |
| EP | 0 911 479 A2 | 4/1999 | |
| EP | 1898042 A2 | 3/2008 | |
| EP | 1939390 A2 | 7/2008 | |
| EP | 1961910 A1 | 8/2008 | |
| FR | 2901304 A1 | 11/2007 | |
| KR | 20100118723 A | 11/2010 | |
| RU | 2418935 C2 | 5/2011 | |
| WO | 2010/101495 A1 | 9/2010 | |
| WO | 2011/150412 A1 | 12/2011 | |
| WO | 2012/085252 A1 | 6/2012 | |

OTHER PUBLICATIONS

International Search Report and Written Opinion dated Jul. 31, 2013 issued in co-pending application No. PCT/EP2013/062300, U.S. Appl. No. 14/408,040; with English partial translation and partial machine translation (24 pages).

Office Action dated Aug. 26, 2016 issued in co-pending U.S. Appl. No. 14/408,040; with PTO-892; without returned IDS forms SB08 (19 pages).

European Search Report and Written Opinion dated Jun. 13, 2016 issued in European application No. EP15174484 corresponding to co-pending U.S. Appl. No. 14/755,688; with English partial translation and partial machine translation (19 pages).

Office Action dated Jul. 26, 2016, issued in co-pending U.S. Appl. No. 14/755,688, which is a CIP of U.S. Appl. No. 14/408,040; with PTO-892; without returned IDS forms SB08 (15 pages).

(56) References Cited

OTHER PUBLICATIONS

Final Office Action dated Apr. 20, 2017 in co-pending U.S. Appl. No. 14/755,688; with PTO-892 (20 pages).

* cited by examiner

ELEMENT FOR MOUNTING A BATTERY IN A WINDING TUBE OF A HOME-AUTOMATION SCREEN

The invention relates to an element for holding a power supply device including en electrical energy storage element used in a home-automation system for controlling a movable screen. The invention also relates to an assembly comprising a power supply device including a storage element and an element for holding this power supply device. The invention further relates to a motorized home-automation system for controlling a movable screen.

A motorized home-automation system for controlling a movable screen can be autonomous, that is to say it carries its own source of electrical energy, without permanently drawing energy from a network distributing electrical energy. In such a system, a power supply device is used, which comprises an electrical energy storage element, such as one or more batteries or one or more rechargeable accumulators. The rechargeable accumulators for example can be recharged with the aid of a photovoltaic panel converting solar energy into electrical energy.

The set up of the power supply device is generally complex. The elements of the power supply device (photovoltaic panels and energy storage elements) may be arranged at a distance from the windable movable screen, whereas an actuator for rotating the winding tube is, for example, arranged in the winding tube. Alternatively, the energy storage elements are also arranged in the winding tube, but the set up and replacement of said elements cause problems. It is generally necessary to disassemble the entire home-automation system so as to be able to change said energy storage elements.

One object of the invention is to provide an element for holding an electrical power supply device that overcomes the mentioned disadvantages and that simplifies the assembly and disassembly. In addition, another object of the invention is to provide a holding element that is suitable for different architectures of home-automation systems having a winding tube, in particular a conventional control system for which the winding tube is held in a fixed position with respect to a support as well as a home-automation system for controlling a screen of which the winding tube is suspended from the canvas and is thus displaceable with respect to the structure of the building.

In particular, the invention proposes a simple, reliable and versatile holding element.

In accordance with the invention, an element makes it possible to hold a power supply device intended to supply power to an actuator for controlling a movable screen. The actuator causes a drive shaft to rotate. The holding element comprises a body provided with a hole for receiving at least part of the power supply device and a longitudinal slit on at least part of the body.

The holding element may comprise a holding rod.

The holding rod may extend at least in part along the length of the body and may be diametrically opposite the longitudinal slit.

The holding rod may extend beyond the body over at least twice the length of the body.

The holding element may comprise a head comprising gripping notches.

The holding element may comprise notches, in particular longitudinal notches, on the outer diameter thereof.

The hole may comprise splines, in particular longitudinal splines.

The body may comprise an outer conical portion, in particular an outer conical portion at one of these ends, in particular an outer conical portion at the end opposite the head.

In accordance with the invention, an assembly comprises a holding element as defined above and a power supply device comprising at least one electrical energy storage element, the power supply device having a geometry for cooperation with the holding element, in particular the power supply device having a geometry that is complementary to the hole and/or to the slit.

The power supply device may comprise at least one electrical wire running the length of the at least one storage element from one of the terminals thereof at one end of the power supply device towards the other end of the power supply device, the electrical wire creating a local extra thickness fitting in the slit in the holding element.

In accordance with the invention, a motorized control system for controlling a windable movable screen comprises an end-plate having a hole receiving an assembly as defined above, such that said assembly is held in the hole with a close fit.

The system may comprise a winding tube mounted rotatably on the end-plate or on a bearing of the end-plate.

The system may comprise an actuator for controlling the winding tube, and in particular an actuator for controlling the winding tube arranged at one end of the winding tube, the control actuator being powered for example by the power supply device, this being arranged at the other end of the winding tube.

The end-plate may comprise a cover closing the hole.

Figure 1:
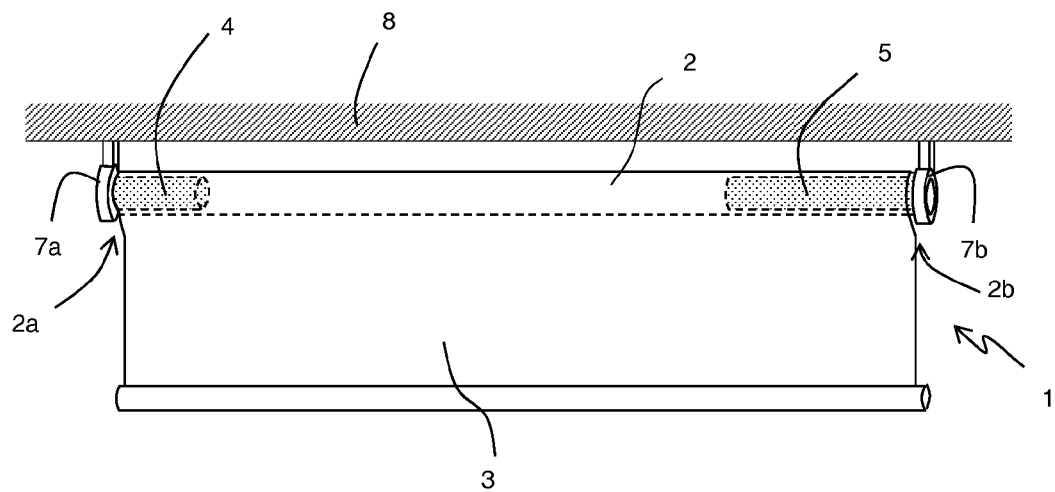
FIG. 1 is an illustration of a first embodiment of a motorized home-automation system for controlling a movable screen.

One embodiment of a motorized home-automation control system 1, shown in FIG. 1, permits the motorized control of a movable screen 3, in particular a screen that can be wound around a winding tube 2, such as a blind. Said screen is intended in particular to be used to prevent or to limit the penetration of sun via an opening in a building.

The motorized home-automation system or screen system comprises an actuator 4 for controlling the winding tube. This actuator is preferably arranged partially or completely in the winding tube. The control actuator is said to be autonomous, that is to say it is powered by a dedicated power supply device 5 comprising an electrical energy storage element 6.

The control actuator is inserted into the winding tube at one of the ends thereof, whereas the power supply device is inserted into the winding tube at the other end thereof.

The actuator moves the winding tube in a known manner. The movable screen is hooked via one of the ends thereof onto the tube. Thus, the rotation of the winding tube drives, in one direction, the winding or the unwinding of the screen on the tube.

The system 1 comprises two end-plates 7a, 7b at either end of the winding tube. These end-plates serve to hold the motorized screen structure on a fixed structure or support 8, for example a ceiling or a wall. In this first embodiment, the winding tube remains fixed (apart from the rotation about its axis) relative to the structure of the building and the canvas is wound and unwound around this winding tube.

Figure 2:
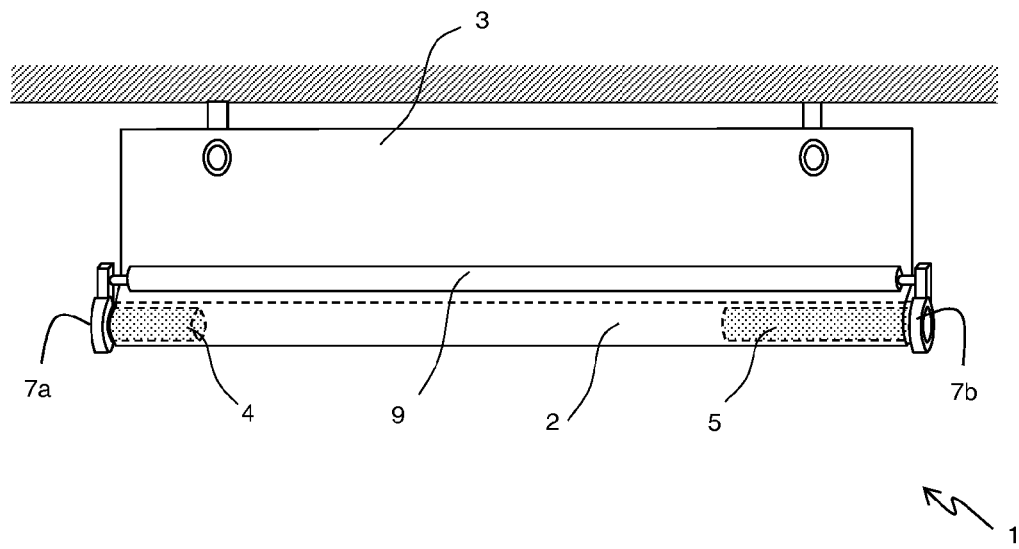
FIG. 2 is an illustration of a second embodiment of a motorized home-automation system for controlling a movable screen.

In a second embodiment shown in FIG. 2, the motorized screen system is intended to be connected to the structure of the building exclusively via the screen, that is to say the motorized screen system is a system which is suspended by the screen and of which the winding tube moves in translation, in particular vertically in translation, as the screen is wound or unwound. Thus, all forces exerted on the system are taken up by the screen. There is preferably no other contact or connection between the system and the building. The end-plates then serve to hold the winding tube relative to the screen, in particular thanks to a bar 9 that takes up torque, said bar being in contact with the screen and being held between the end-plates.

Figure 3:
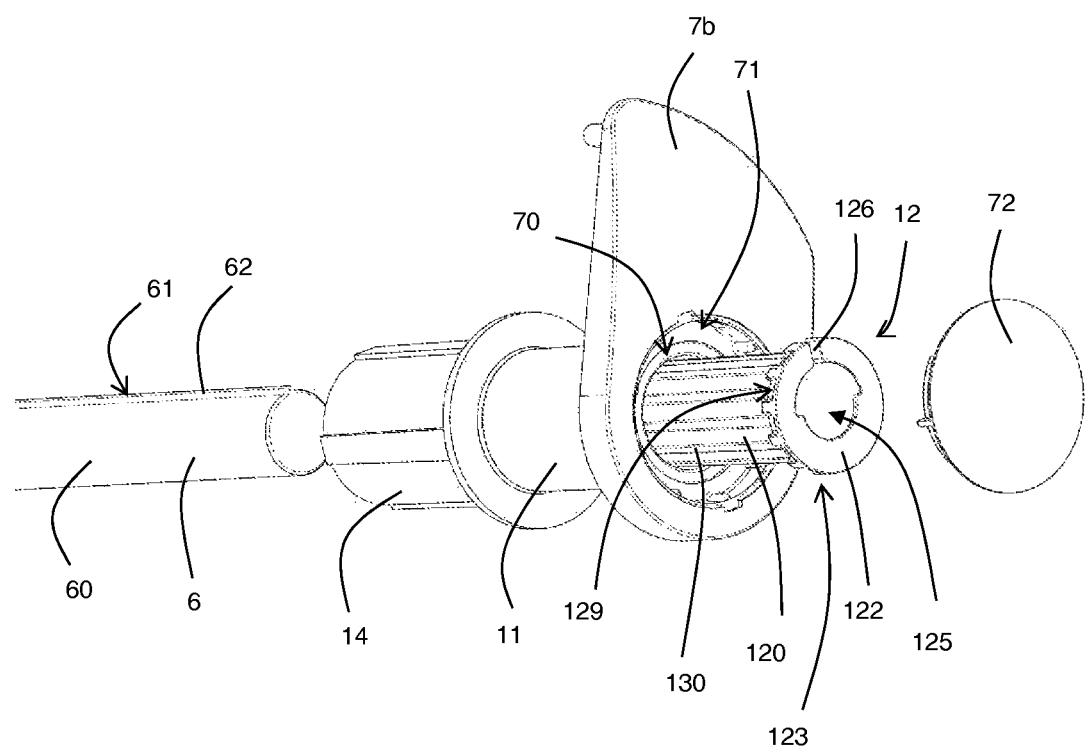
FIG. 3 shows a sectional view of a motorized home-automation system for controlling a movable screen, the system comprising a first embodiment of an element for holding a power supply device including an electrical energy storage element in a winding tube of a screen.
Figure 4:
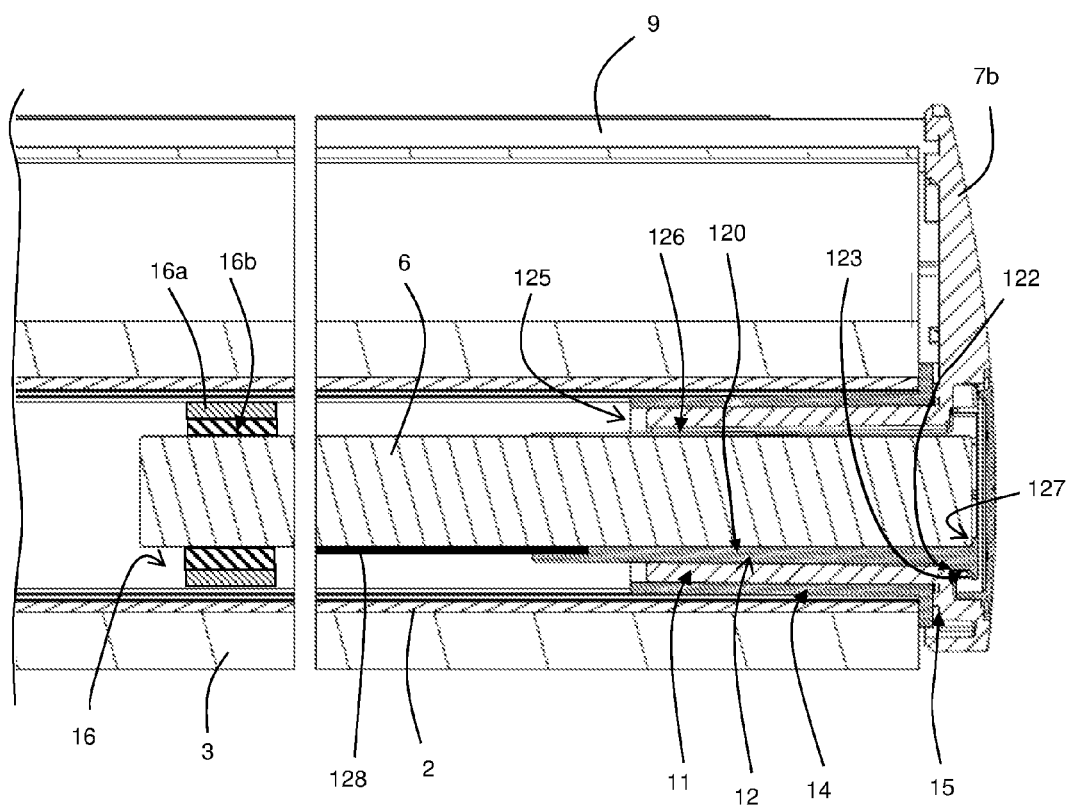
FIG. 4 shows a perspective view of a second embodiment of an element for holding a power supply device including an electrical energy storage element in a winding tube of a screen.

As shown in FIGS. 3 and 4, a hollow cylinder 11 extends from one of the end-plates 7b in order to receive, in the inner part thereof, a holding element 12 making it possible to hold the power supply device comprising the electrical energy storage element. The holding element may be longer than the hollow cylinder of the end-plate. The winding tube is guided in rotation on the outer part of the hollow cylinder of the end-plate 7b, either directly or on a connected bearing 14, for example a smooth bearing such as a self-lubricating ring. The bearing is mounted for example so as to slide over the hollow cylinder of the end-plate. The bearing is, for example, fitted on until in abutment against a shoulder 15 of the end-plate. The winding tube is mounted so as to slide over the bearing.

The holding element supports the electrical power supply device. To do this, said holding element comprises a holding body 120 arranged so as to hold the power supply device completely or partly inside the winding tube.

The energy storage element for example comprises a set of batteries or a set of accumulators (not shown). This set is advantageously enclosed in a casing 60. For example, the casing makes it possible to hold the different accumulators or the different batteries in contact with one another, in particular in galvanic contact, and also to protect one or more of the electrical wires 61 making it possible to connect the output terminal of the energy storage element to the input terminal. The casing may also ensure a rigidity of the assembly with respect to bending. For example, it may ensure that the deflection of the power supply device under its own weight is less than 4 mm when it is held horizontally via just one of the ends thereof. The casing for example is made of synthetic material, such as plastic, or light metal, such as aluminium. The power supply device on the whole has a cylindrical form over the entire length thereof or over just a portion thereof. The term "cylindrical" is understood in accordance with its mathematical definition, that is to say having the form of a cylinder which is a surface generated by a set of parallel generator lines resting on a closed guide curve. The cylinder is preferably a cylinder of revolution and thus has a circular base, but may also have an oval or polygonal base. It comprises in particular an extra thickness 62 at the passage of the electrical wire. The power supply device also comprises electrical connectors (not shown) connected to an input terminal and an output terminal of the storage element, in particular via the electrical wire.

The length of the power supply device is dependent on the selected voltage (for example 5V or 12V) for the same diameter. The length may have an effect on the deflection: if necessary, a ring bearing 16 can be used to hold the free end of the power supply device. A first ring 16a is connected to the winding tube. This first ring integrates a second ring 16b, which is freely rotatable with respect to the first ring. The free end can be held floatingly in the second ring. It is thus easily inserted in the event of a replacement of the power supply device.

The holding element also comprises the body 120, possibly a head 122, at the end of the body, forming a shoulder 123.

The holding element comprises a hole 125. The hole is formed in the body, and in particular in the length of the body. This hole is intended to cooperate with the power supply device so as to hold and support said power supply device. The hole cooperates in particular with the cylindrical form of the energy storage element. The body is in particular provided with a longitudinal slit 126 enabling easy deformation of the body for the insertion of the power supply device and as said power supply device is inserted in the hole. The slit extends for example over part or over the entire length of the holding element. It also makes it possible to accommodate the extra thickness of the electrical wire of the power supply device.

The hole is advantageously a through-hole and thus makes it possible to receive the electrical connectors of the power supply device, for example at the head of the holding element. Said hole may have a smaller diameter at the head so as to form a stop 127 as the power supply device is inserted into the holding element.

The slit may extend solely along the body and may be extended by an inner groove at the shoulder.

As the power supply device is held in the holding element, the power supply device is inserted into the hole by guiding the end comprising the connectors towards the hole and by orienting the extra thickness in the extension of the longitudinal slit. The power supply device is then slid into the holding element. The power supply device is held in the holding element by cooperation between the forms of said power supply device and said holding element and also by clamping, the holding element deforming slightly thanks to the longitudinal slit therein. In fact, the inner diameter of the hole in the rest state is slightly smaller than the outer diameter of the cylindrical casing of the power supply device.

The hole may have splines (not shown), in particular splines extending longitudinally, so as to improve this clamping and holding function. Alternatively or in a manner complementary to the splines, the hole may have notches or knurling.

The holding element may comprise a holding rod 128. The holding rod extends from the body. In particular, the rod is arranged so as to extend parallel or substantially parallel to the axis of the winding tube and/or to the axis of the energy storage element. The holding rod, which is not exposed to any deformation during the assembly, may be made of a material that is more rigid than that forming the holding element.

The end-plate 7b and/or bearing thereof also comprises/comprise a hole 70. This hole is intended to cooperate with the holding element. The hole in the end-plate cooperates in particular with the outer form of the body. The hole is preferably a through-hole, forming an opening 71 on the outer part of the end-plate, which opening can be closed by a cover 72. This opening makes it possible to access the holding element without disassembling the rest of the system. The head of the holding element advantageously comprises gripping notches 129. These notches in particular allow a tool to be passed through, such as a flat-head screwdriver, making it possible to act on the head, in particular by means of a lever action, so as to remove the holding element and thus the power supply device from the hole in the end-plate.

The opening formed in the end-plate constitutes a first part of greater diameter intended to receive the head of the holding element, and the hole constitutes a second part of which the inner diameter is substantially equal to the outer diameter of the body. The cooperation between the second part of the hole and the holding element is implemented by clamping and deformation of the holding element in the hole. The outer form of the body may have splines 130, in particular splines extending longitudinally so as to improve this clamping function.

In a variant or in a complementary manner, the body may comprise a conical outer portion, in particular a conical outer portion at one of these ends, in particular a conical outer portion at the end opposite the head. This conical portion may have an angle at the summit of 0.5° (draft) or greater than 1° if desired. This conical portion makes it possible to facilitate the insertion or the removal of the holding element into/from the hole in the end-plate.

Thus, the power supply device and the holding element are positioned in the winding tube as follows:

The power supply device is positioned in the hole in the holding element as described above. It thus causes a slight deformation of the holding element, the outer diameter thereof increasing, in particular by enlargement of the slit.

The assembly formed by the holding element and the power supply device is positioned in the hole in the end-plate by applying an axial force to said assembly. This thus causes a slight deformation of the holding element, the outer diameter thereof reducing by compressing the power supply device, in particular by narrowing of the slit. Thus, due to the friction or any potential notches or knurling at the interface between the holding element and the power supply device, a good mechanical connection fixing the power supply device to the end-plate is obtained. Likewise, due to the friction at the interface between the holding element and the end-plate, a good mechanical connection fixing the power supply device to the end-plate is obtained.

The electrical connectors of the power supply device are connected to the power supply wires of the actuator.

The cover of the opening in the end-plate is closed.

To change batteries, or should accumulators of the power supply device become faulty, the steps above are carried out in reverse order.

The invention also applies within the scope of a movable element that cannot be wound on the tube, for example a blind of the pleated or gathered type of inverted style, of which the cords are wound on the tube containing the power supply device. The invention also applies within the scope of a screen of the swing type (roller or gate), of which the power supply device would be housed in an actuation tube, for example a tube positioned at the hinges.

The invention claimed is:

1. An assembly comprising:
    an electric power supply device for supplying power to an actuator for controlling a movable screen, the actuator causing a drive shaft to rotate, and
    a holding element holding the power supply device, wherein the holding element comprises:
        a tubular body provided with:
            a hollow cylindrical wall surrounding a hole receiving at least part of the power supply device, and
            a longitudinal slit on at least part of the tubular body, the longitudinal slit being provided along at least a part of the cylindrical wall, and the longitudinal slit enabling deformation of the tubular body receiving the power supply device, and
    wherein the power supply device comprises at least one electrical energy storage element, the power supply device having a geometry that cooperates with the holding element, wherein the hole receiving the power supply device is slightly enlarged thanks to the longitudinal slit, relative to a rest state of the holding element when the power supply device is not present in the holding element, so that the holding element holds the power supply device by radial inward clamping.

2. The assembly according to claim 1,
    wherein the holding element further comprises a head comprising gripping notches.

3. The assembly according to claim 1,
    wherein the power supply device comprises at least one electrical wire running a length of the at least one storage element from one of a plurality of terminals thereof at one end of the power supply device towards the other end of the power supply device, the at least one electrical wire creating a local extra thickness fitting in the slit in the holding element.

4. The assembly according to claim 1,
    wherein the power supply device has a geometry that is complimentary to at least one of the hole and the slit.

5. The assembly according to claim 1, wherein
    the hole comprises a stop at one longitudinal end of the cylindrical wall, and
    the longitudinal slit extends to an open edge of the cylindrical wall at the other longitudinal end of the cylindrical wall.

6. The assembly according to claim 1, wherein the hole of the tubular body has a geometry for cooperating with an electric power supply device in a cylindrical form.

7. The assembly according to claim 1, wherein the longitudinal slit is a through slit.

8. A motorized control system for controlling a windable movable screen, comprising:
    the assembly according to claim 1, and
    an end-plate having a receiving hole receiving the assembly,
    wherein the assembly is frictionally held in the receiving hole of the end-plate with a close fit.

9. The assembly according to claim 1, wherein the power supply device comprises a plurality of electrical energy storage elements, and wherein the plurality of electrical energy storage elements are arranged inside the tubular body so as to be in galvanic contact with each other in a longitudinal direction of the tubular body.

10. The assembly according to claim 1,
    wherein the holding element comprises a holding rod.

11. The assembly according to claim 10,
    wherein the holding rod extends at least in part along a length of the tubular body and is diametrically opposite the longitudinal slit.

12. The assembly according to claim 10,
    wherein the holding rod extends beyond the tubular body over at least twice the length of the tubular body.

13. The assembly according to claim 1,
    wherein the holding element comprises splines on an outer diameter thereof.

14. The assembly according to claim 13, wherein the splines are longitudinal splines.

15. The assembly according to claim 1, wherein the hole comprises splines.

16. The assembly according to claim 15, wherein the splines are longitudinal splines.

17. The assembly according to claim 1, wherein the tubular body comprises a conical outer portion.

18. The assembly according to claim 17, wherein the conical outer portion is located at an end of the tubular body.

19. The assembly according to claim 17, wherein the holding element further comprises a head located at a first end of the tubular body, and wherein the conical outer portion is located at a second end of the tubular body opposite the head.

20. A motorized control system for controlling a windable movable screen, comprising:
an end-plate having a receiving hole receiving the assembly according to claim 1,
wherein the assembly is held in the receiving hole of the end-plate with a close fit.

21. The motorized control system according to claim 20, wherein the system comprises a winding tube mounted rotatably on the end-plate or on a bearing of the end-plate.

22. The motorized control system according to claim 20, wherein the system comprises
a winding tube having opposite first and second ends along a longitudinal length of the winding tube, and
an actuator for controlling the winding tube, the actuator being powered by the power supply device,
wherein the actuator is arranged at one of the first and second ends of the winding tube and the power supply device is arranged at the other of the first and second ends of the winding tube.

23. The motorized control system according to claim 22, wherein the system comprises a winding tube, and
wherein the actuator for controlling the winding is arranged at one end of the winding tube, the actuator being powered by the power supply device, the power supply device being arranged at the other end of the winding tube.

24. The motorized control system according to claim 20, wherein the end-plate comprises a cover closing the receiving hole.

25. An assembly comprising:
an electric power supply device for supplying power to an actuator for controlling a movable screen, the actuator causing a drive shaft to rotate, and
a holding element for holding the power supply device,
wherein the holding element comprises:
a body provided with:
a hollow cylindrical wall surrounding a hole for receiving at least part of the power supply device, and
a longitudinal slit on at least part of the body,
wherein the power supply device comprises at least one electrical energy storage element, the power supply device having a geometry for cooperation with the holding element, and
wherein the holding element further comprises a head forming a shoulder at a first end of the body, the head comprising gripping notches, the slit opening at a second end of the body opposed to the first end.

26. The assembly according to claim 25, wherein the holding element comprises splines on an outer diameter thereof.

27. An assembly comprising:
an electric power supply device for supplying power to an actuator for controlling a movable screen, the actuator causing a drive shaft to rotate, and
a holding element for holding the power supply device,
wherein the holding element comprises:
a body provided with:
a hollow cylindrical wall surrounding a hole for receiving at least part of the power supply device, and
a longitudinal slit on at least part of the body,
wherein the power supply device comprises at least one electrical energy storage element, the power supply device having a geometry for cooperation with the holding element, and
wherein the hole comprises splines enabling radial outward deformation of the tubular body receiving the power supply device, relative to a rest state of the holding element when the power supply device is not present in the holding element, so that the holding element holds the power supply device by radial inward clamping.

* * * * *